United States Patent [19]

Fujii et al.

[11] Patent Number: 5,868,337
[45] Date of Patent: Feb. 9, 1999

[54] LARGE TAPE CASSETTE USABLE IN A RECORDING/REPRODUCING APPARATUS CAPABLE OF USING BOTH A LARGE TAPE CASSETTE AND A MINIATURE TAPE CASSETTE

[75] Inventors: Hiroshi Fujii, Tokyo; Shuichi Ota, Kanagawa; Takashi Sawada, Kanagawa; Masato Yamaguchi, Kanagawa; Masaki Takase, Tokyo, all of Japan

[73] Assignee: Sony Corporation, Tokyo, Japan

[21] Appl. No.: 911,585

[22] Filed: Aug. 14, 1997

Related U.S. Application Data

[63] Continuation of Ser. No. 686,275, Jul. 25, 1996, abandoned, which is a continuation of Ser. No. 319,657, Oct. 7, 1994, abandoned.

[30] Foreign Application Priority Data

Oct. 15, 1993 [JP] Japan ................................. 5-280704

[51] Int. Cl.$^6$ ........................ G11B 23/087; G11B 23/04
[52] U.S. Cl. ................... 242/347.1; 242/338.4; 360/132
[58] Field of Search ............................ 242/347.1, 338.4; 360/132

[56] References Cited

U.S. PATENT DOCUMENTS

| | | |
|---|---|---|
| 4,004,752 | 1/1977 | Kamaya .............................. 360/96 X |
| 4,449,677 | 5/1984 | Ohta et al. ...................... 242/347.1 X |
| 4,809,113 | 2/1989 | Nishimura et al. ..................... 360/132 |
| 5,065,955 | 11/1991 | Fujii .............................. 242/347.1 X |
| 5,295,637 | 3/1994 | Takeda et al. ...................... 360/132 X |
| 5,412,525 | 5/1995 | Ota et al. ........................ 242/347.1 X |

FOREIGN PATENT DOCUMENTS

| | | |
|---|---|---|
| 0 133 822 | 3/1985 | European Pat. Off. . |
| 0 452 008 | 10/1991 | European Pat. Off. . |
| 0 464 687 | 1/1992 | European Pat. Off. . |

Primary Examiner—John Q. Nguyen
Attorney, Agent, or Firm—Frommer Lawrence & Haug, LLP; William S. Frommer

[57] ABSTRACT

A tape cassette including: a case consisting of an upper half and a lower half, and having a recess in its front side; two tape reels rotatably supported within the case; a recording tape having opposite ends fastened to the two tape reels, respectively, and wound on the two tape reels so that a portion thereof extends along the front side of the recess of the case; and a lid assembly covering the portion of the recording tape extending along the front side of the recess while the tape cassette is not in use; wherein the lower half is formed with locating contact protrusions; the locating contact protrusions being contacted with locating lugs formed in a recording/reproducing apparatus for locating a miniature tape cassette commonly used for the recording/reproducing apparatus; and the locating contact protrusions being engaged with gaps formed on the lower edge of a front surface portion of the lid assembly when the tape cassette is not in use and the lid assembly is at its closed position.

9 Claims, 13 Drawing Sheets

LARGE TAPE CASSETTE USABLE IN A RECORDING/REPRODUCING APPARATUS CAPABLE OF USING BOTH A LARGE TAPE CASSETTE AND A MINIATURE TAPE CASSETTE

This application is a continuation of application Ser. No. 08/686,275 filed Jul. 25, 1996, abandoned, which is a continuation of Ser. No. 08/319,657, filed Oct. 7, 1994, abandoned.

BACKGROUND OF THE INVENTION

The present invention relates to a novel tape cassette and, more specifically, to a large tape cassette to be used on a recording/reproducing apparatus capable of using both a large tape cassette and a miniature tape cassette. The present invention is intended to enhance the dustproof performance and the strength of a large tape cassette having exclusive locating contact protrusions other than the locating contact protrusions common to a miniature tape cassette.

There is known a recording/reproducing apparatus capable of using both a large tape cassette and a miniature tape cassette, that is, the so-called compatible recording/reproducing apparatus.

Such a recording/reproducing apparatus are designed so as to use as many members and devices common to a large tape cassette and a miniature tape cassette as possible to simplify the construction thereof.

For example, recesses, i.e., mouths into which a tape driving member is inserted when the tape cassette is loaded into a recording/reproducing apparatus, of substantially the same size are formed respectively in the large tape cassette and the miniature tape cassette to use the same tape driving member in the same operating mode for driving the recording tapes of both the large tape cassette and the miniature tape cassette.

FIG. 15 shows, in a superposed view, a large tape cassette a and a miniature tape cassette b respectively having mouths c and d of substantially the same size to be used on such a recording/reproducing apparatus.

Some compatible recording/reproducing apparatuses are provided with common locating lugs to be used for both locating the large tape cassette a and locating the miniature tape cassette b.

When the miniature tape cassette is to be used on such a recording/reproducing apparatus, the miniature tape cassette must be provided with locating contact protrusions in ranges e.

Naturally, the large tape cassette a also must be provided with locating contact protrusions in the ranges e to use the common locating lugs.

However, as regards the large tape cassette a, it is preferable, in view of stable locating, that locating contact protrusions of the large tape cassette a to be brought into contact with locating lugs are separated from each other by a comparatively large distance and hence it is preferable to separate the locating contact protrusions of the large tape cassette a by a largest possible distance from each other when the large tape cassette a is used on a recording/reproducing apparatus designed for using only the large tape cassette a. Accordingly, the locating contact protrusions of the large tape cassette <a> are formed in ranges f.

The tape cassette is provided with a lid to protect an exposed portion of the recording tape contained therein.

If the locating contact protrusions are covered with the lid assembly, the tape cassette cannot be located with the lid assembly positioned at its closed position for covering the front side of the recording tape. Therefore, as shown in FIG. 16, a recess h is formed in a lid q so as to receive a locating contact protrusion i in the recess h so that the locating contact protrusion i is exposed to enable the tape cassette to be located with the lid q positioned at its closed position.

In such a structure, however, a gap is formed between the locating contact protrusion i and the upper edge of the recess h to deteriorate the dustproof capability of the tape cassette, if the lid q is moved even slightly toward the open position. If the locating contact protrusions are formed over the wide ranges f as in the conventional large tape cassette a, a gap is formed in a wide range when the lid q is slightly opened, which deteriorates the dustproof capability of the tape cassette significantly.

Since portions of the lid q other than those in which the recesses h are formed are not supported from behind by the case of the tape cassette, the lid q is flexed easily backward when a pressure is applied thereto. If such portions are formed in the wide ranges f, the strength of the lid q is reduced greatly.

SUMMARY OF THE INVENTION

An object of the present invention is to enhance the dustproof performance and the strength of a large tape cassette having exclusive locating contact protrusions other than the locating contact protrusions common to a miniature tape cassette.

To solve the aforesaid problems, the present invention provides a tape cassette comprising a case consisting of an upper half and a lower half, and provided with a recess in its front side, two tape reels supported for rotation within the case, a recording tape having opposite ends fastened to the two tape reels, respectively, and wound on the two tape reels so that a portion thereof extends along the front side of the recess of the case, and a lid assembly covering the portion of the recording tape extending along the front side of the recess while the tape cassette is not in use; characterized in that the lower half has first locating contact protrusions that come into contact with first locating lugs formed in a recording/reproducing apparatus, on which the tape cassette is to be used, to locate a miniature tape cassette when the tape cassette is loaded into the recording/reproducing apparatus, and are received in recesses formed in the lower edge of the front wall of the front lid of the lid assembly when the tape cassette is not in use and the lid assembly is at its closed position.

When the tape cassette of the present invention is loaded into a compatible recording/reproducing apparatus provided with common locating lugs for locating both a large tape cassette and a miniature tape cassette and capable of using both a large tape cassette and a miniature tape cassette, the tape cassette of the present invention can be located by the common locating lugs. When the tape cassette of the present invention is loaded into a recording/reproducing apparatus designed specially for using a large tape cassette, the locating contact protrusions of the tape cassette spaced a large distance apart come into contact with locating lugs so that the tape cassette can stably be located, and the dustproof capability of the tape cassette can be maintained.

DETAILED DESCRIPTION OF THE PREFERRED EMBODIMENTS

Figure 1:
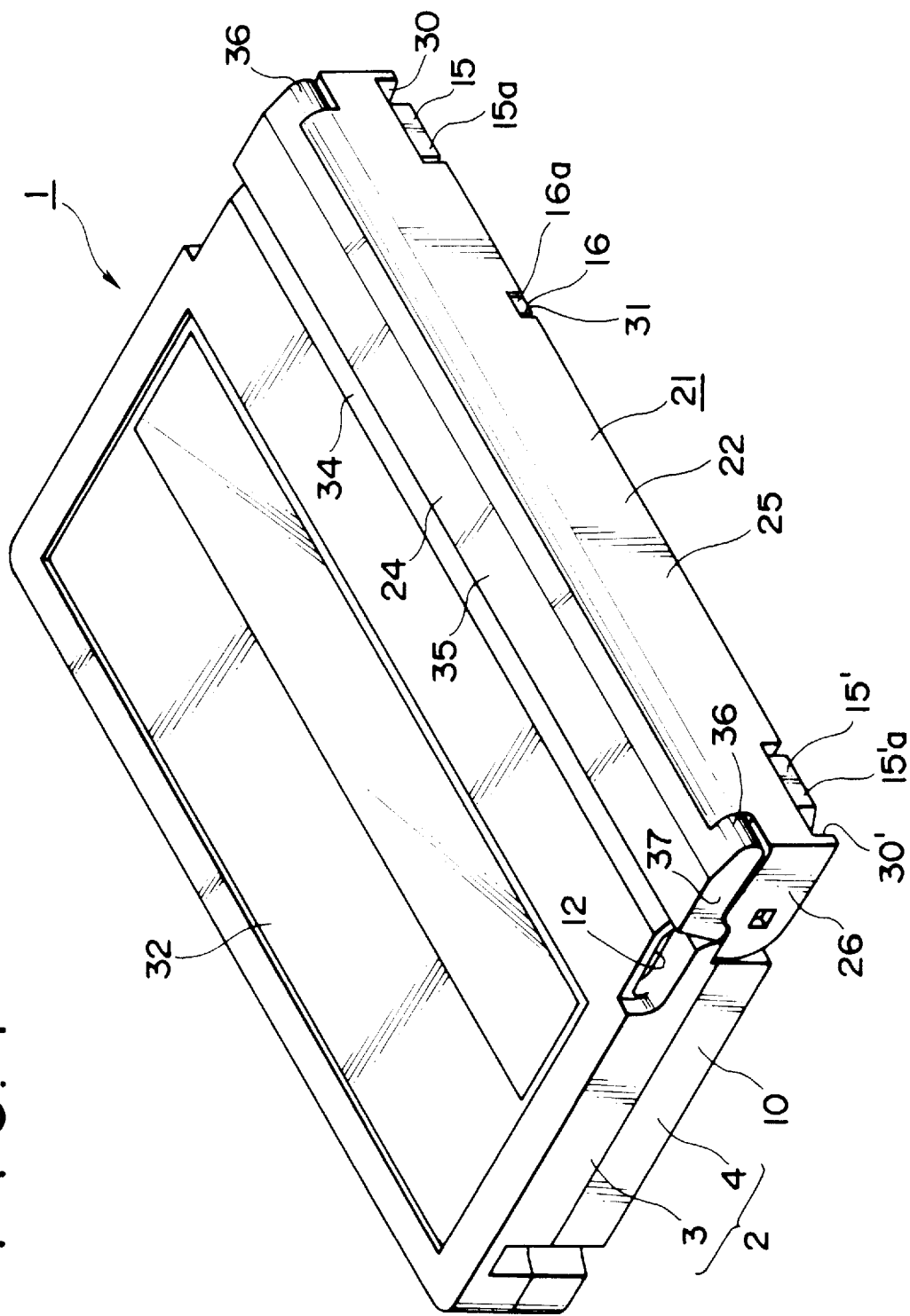
FIG. 1 is a perspective view of one embodiment of a tape cassette of the present invention.
Figure 2:
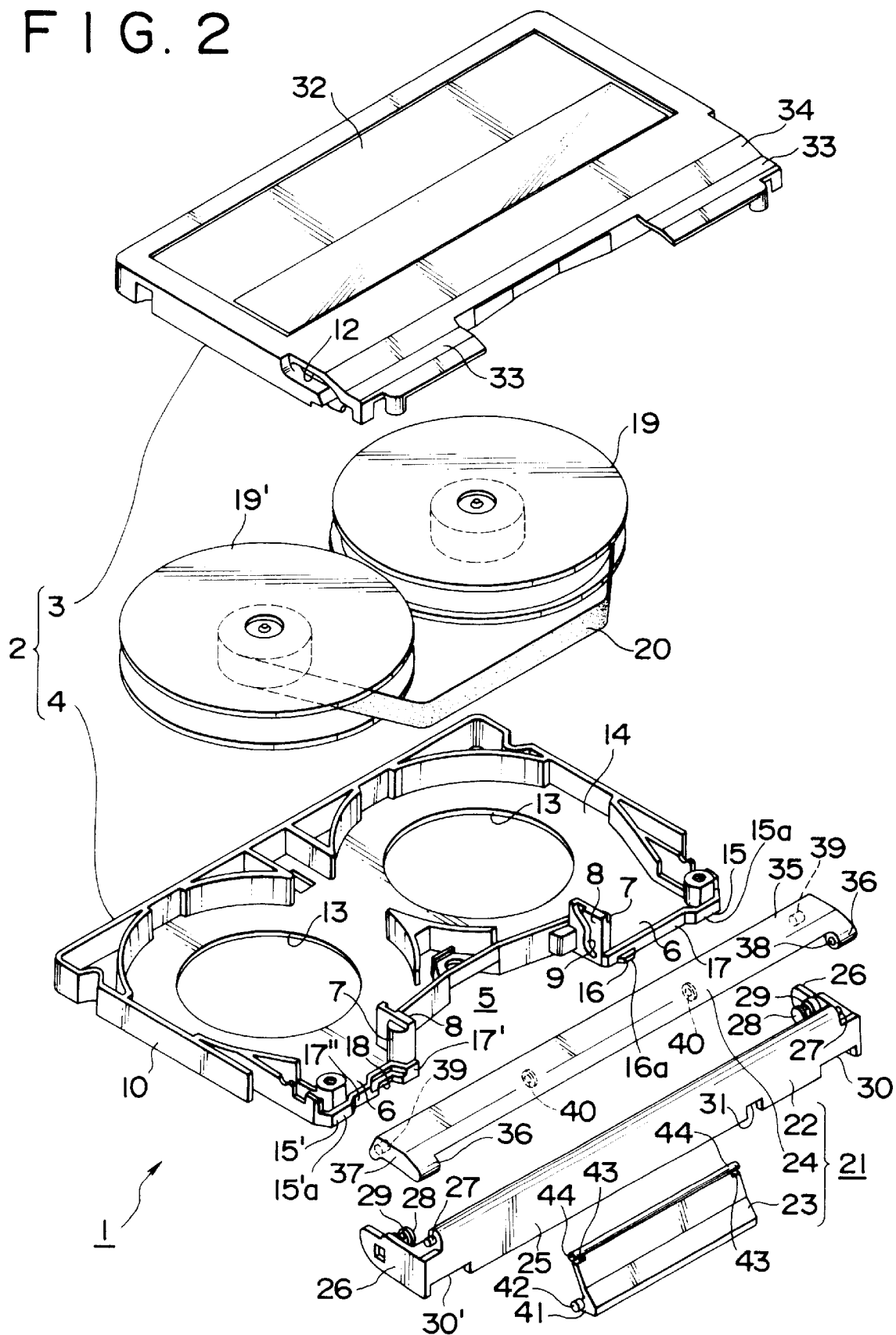
FIG. 2 is an exploded perspective view of the tape cassette.
Figure 3:
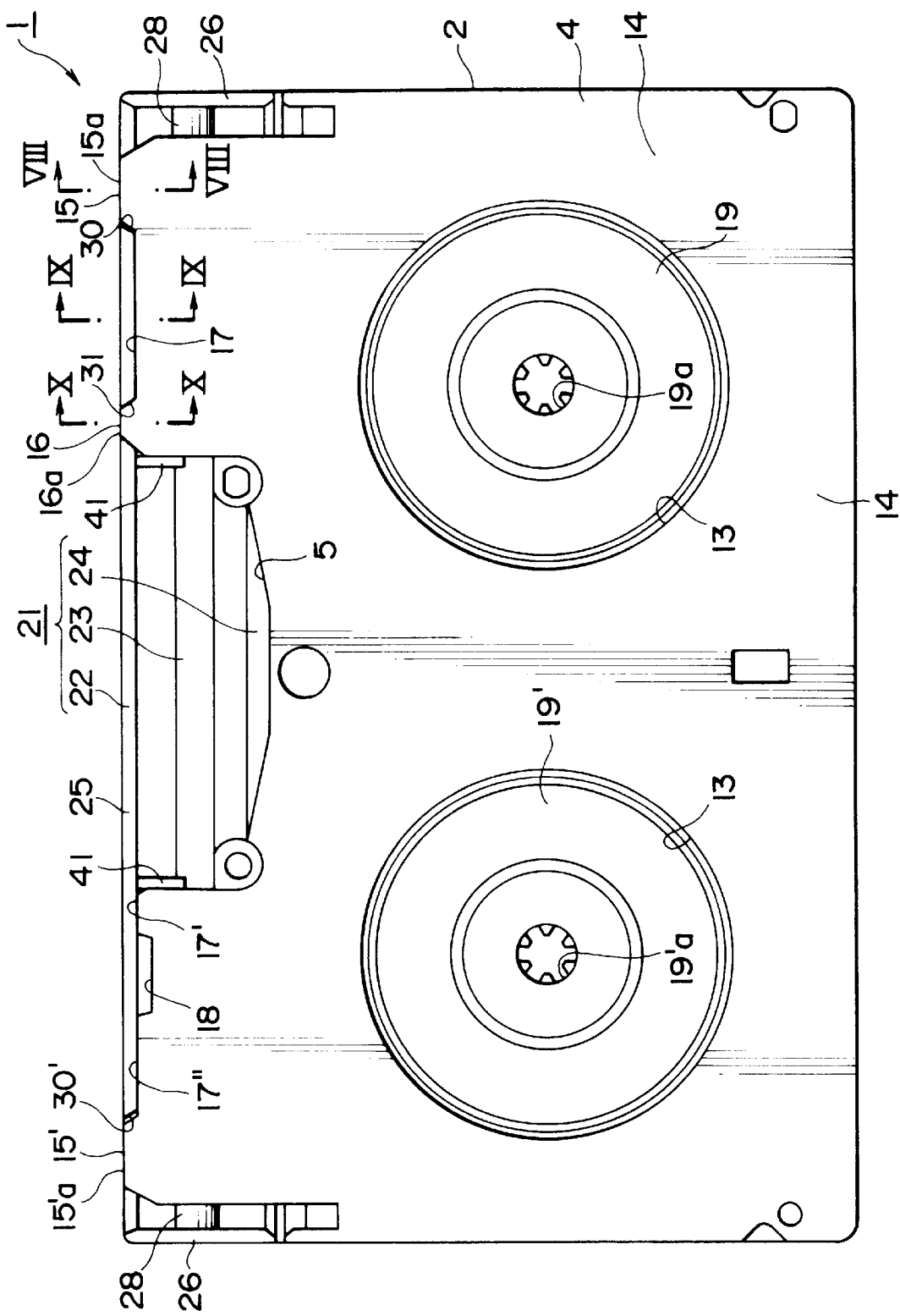
FIG. 3 is a bottom view of the tape cassette.
Figure 4:
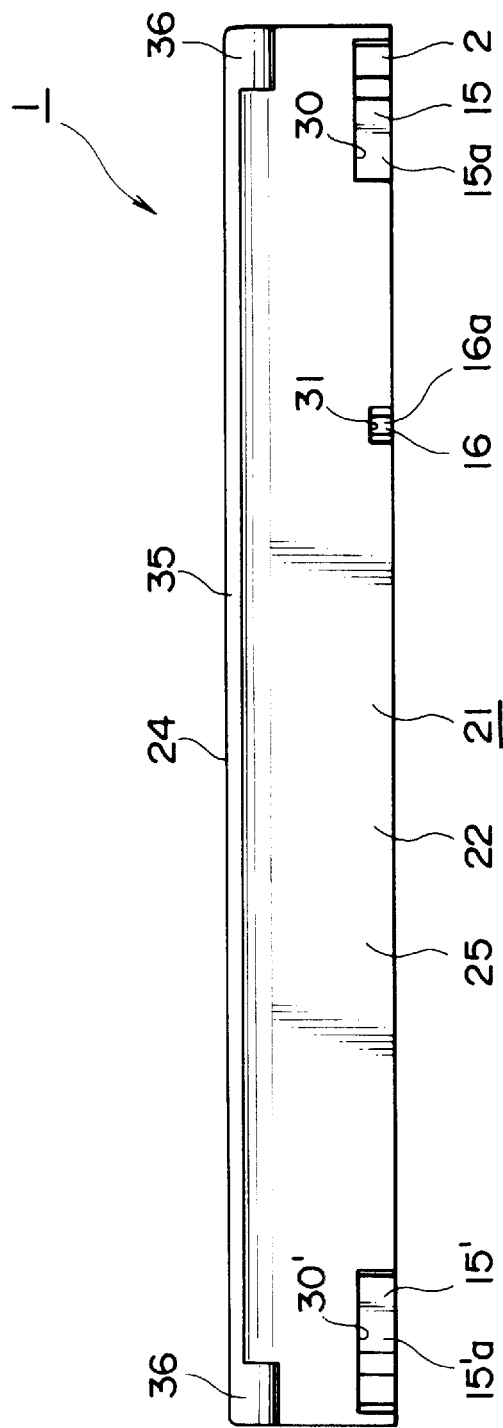
FIG. 4 is a front view of the tape cassette.
Figure 5:
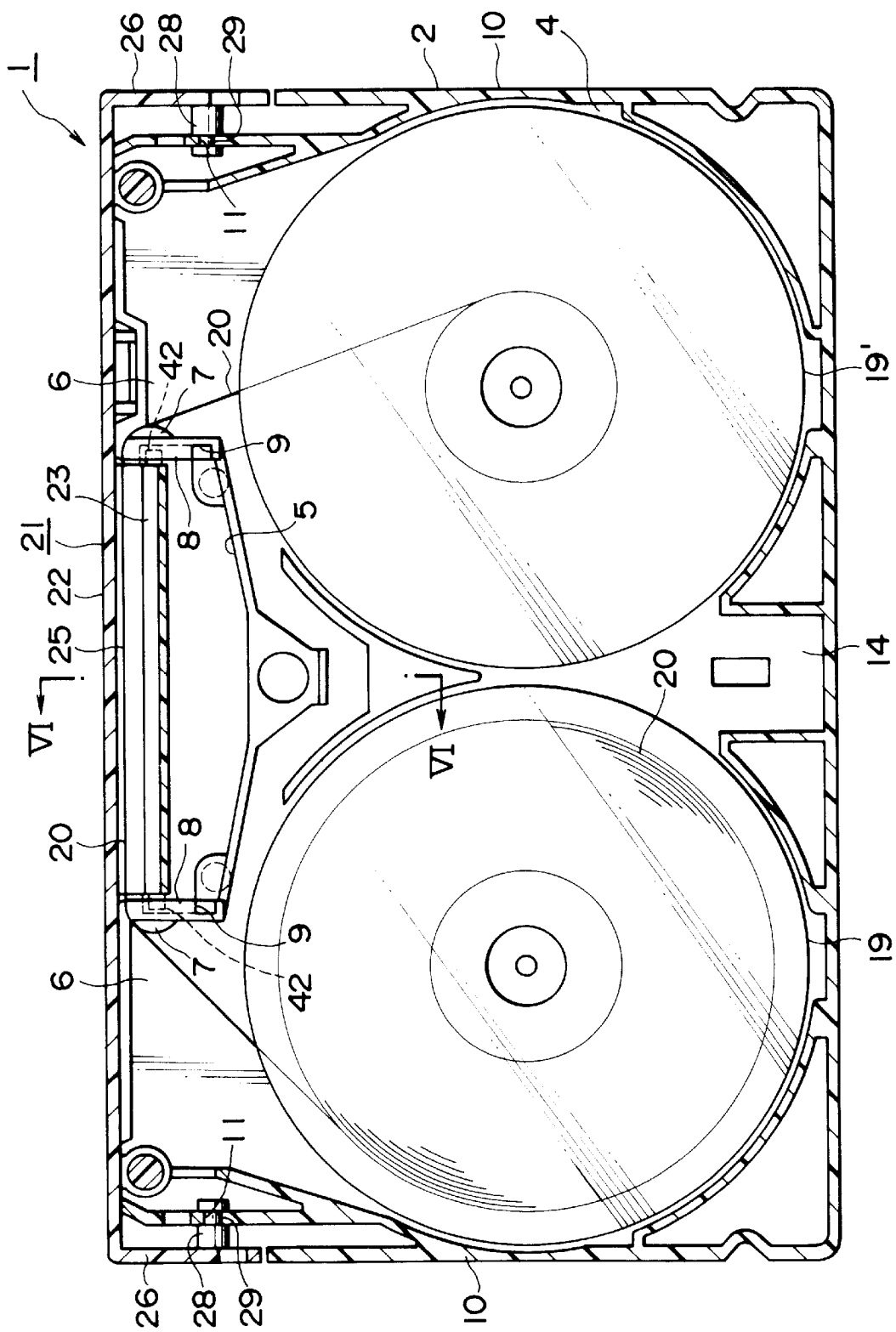
FIG. 5 is a horizontal sectional view of the tape cassette.

A tape cassette in a preferred embodiment according to the present invention will be described hereinafter with reference to the accompanying drawings.

In the drawings, indicated at 1 is a tape cassette in a preferred embodiment according to the present invention, at 2 is a case of the tape cassette 1.

The case 2 is formed by putting an upper half 3 and a lower half 4 one over the other and joining together the same and has the shape of a laterally elongate, parallelepipedic, flat box.

The front middle portion of the case 2 is recessed to form a mouth 5 having front, upper and lower open sides.

Tape outlets 6 are formed on the opposite sides of the mouth 5 in the front portion of the case 2, and tape guides 7 are formed within the tape outlets 6 near the opposite ends of the mouth 5, respectively.

The opposite ends of the mouth 5 are defined by mouth side walls 8, and gently winding, substantially S-shaped guide grooves 9 are formed in the opposite surfaces of the mouth side walls 8, respectively.

Holes 11 for supporting a lid assembly are formed in the front portions of the side walls 10 of the case 2, respectively, and guide grooves 12 are formed in the outer surfaces of the side walls 10, respectively, so as to extend along the length of the side walls 10.

Reel holes 13 are formed in the substantially middle portion with respect to the depth of the bottom wall 14 of the case 12. The reel holes 13 are spaced transversely.

Locating contact protrusions 15 and 15' are formed at the opposite ends, respectively, of the front wall of the case 2. The locating contact protrusions 15 and 15' protrude toward the front from positions below the tape outlets 6.

A locating contact protrusion 16 is formed near the left end of the mouth 5 on the front wall of the case 2. The locating contact protrusion 16 protrudes toward the front from a position below the tape outlets 6. The upper surface of the locating contact protrusion 16 is slightly below a plane including the upper surfaces of the locating contact protrusions 15 and 15'.

The locating contact protrusions 15, 15' and 16 are formed on the lower half 4, and the respective front surfaces 15a, 15'a and 16a of the locating portions 15, 15' and 16 are substantially flush with each other.

A portion 17 of the front surface of the case 2 extending between the locating contact protrusions 15 and 16, and over the locating contact protrusion 16, a portion 17' of the same contiguous with the right end of the mouth 5, and a portion 17" of the same contiguous with the left side of the locating contact protrusion 15' are substantially flush with each other, and are included in a first plane behind a second plane including the respective front surfaces 15a, 15'a and 16a. A portion of the front surface of the case 2 extending between the portions 17' and 17" is included in a third plane behind the first plane.

Tape reels 19 and 19' are supported for rotation within the case 2 and are spaced out transversely. A magnetic tape 20 has opposite ends fastened to the tape reels 19 and 19', respectively, and is wound on the tape reels 19 and 19'. Splined holes 19a and 19'a of the hubs of the tape reels 19 and 19' are exposed in the reel holes 13, respectively.

A portion of the magnetic tape 20 is pulled outside the case 2 through the tape outlets 6, and is wound round the guide grooves 9 so as to extend across the mouth 5.

When the tape cassette 1 is not in use, a lid assembly 21 covers the exposed portion of the magnetic tape 20 to protect the same.

The lid assembly 21 has a front lid 22 for covering the front side of the exposed portion of the magnetic tape 20 and the front sides of the tape outlets 6, a back lid 23 for covering the back side of the exposed portion of the magnetic tape 20 in the mouth 5, and an upper lid 24 for covering the upper side of the mouth 5. The lids 22, 23 and 24 of the lid assembly 21 are formed of a synthetic resin.

The front lid 22 has, in an integral piece, a strip-shaped front wall 25 of a size large enough to cover the front surface of the case substantially entirely, side walls 26 projecting backward from the opposite ends of the front wall 25. The upper portions of the opposite ends of the front wall 25 are cut out and pins 27 project from the opposite end surfaces of the front wall 25, respectively.

A pivot shaft 28 projects inward from the inner surface of each of the side walls 26 of the front lid 22 at a position nearer to the upper edge of the side wall 26 and slightly behind the middle of the side wall 26. Annular grooves 29 are formed in the circumferences of the pivot shafts 28 at positions near the free ends of the pivot shafts 28, respectively.

A comparatively long recesses 30 and 30' are formed in the lower edge of the front wall 25 near the opposite ends of the front wall 25, and a small recess 31 is formed in the lower edge of the front wall 25 at a position between the left recess 30 and the middle of the front wall 25. The depth of the recess 31 is slightly smaller than those of the recesses 30 and 30'.

The pivot shafts 28 of the front lid 22 are inserted in the holes 11 of the case 2 so that the edges of the holes 11 engage the annular grooves 29 of the pivot shafts 28, respectively. Thus, the front lid 22 is supported for turning in a vertical plane on the case 2.

The upper lid 24 has, in an integral piece, a substantially strip-shaped main wall 35 for covering the projections 33 of the top wall 32 of the case 2, the upper side of the mouth 5 and portions excluding the back portion of an inclined portion 34 extending behind the projections 33, connecting walls 36 extending toward the front from the opposite ends of the main wall 35, and vertical side walls 37 extending from the outer ends of the main wall 35 and the connecting walls 36.

Holes 38 are formed in the inner end surfaces, i.e., surfaces facing each other, of the connecting walls 36, and guide pins 39 project from the inner surfaces of the back portions of the side walls 37.

Support lugs 40 provided with holes 40a are formed on the lower surface of the main wall 35 at positions near the middle with respect to the length and at the middle with respect to the width.

The pins 27 of the front lid 22 are fitted rotatably in the holes 38 of the upper lid 24 so that the upper lid 24 is able to turn on the pins 27 relative to the front wall 25 of the front lid 22. The guide pins 39 of the upper lid 24 are slidably fitted in the guide grooves 12 formed in the front ends of the side walls of the case 2, respectively.

The back lid 23 has the shape of a rectangular plate having a length substantially equal to the width of the mouth 5. The back lid 23 has projections 41 projecting backward from the lower ends of the opposite ends thereof, and guide pins 42 project from the outer surfaces of the projections 41, respectively.

The upper edge of the back lid 23 is rounded substantially in the shape of a round rod, and recesses 43 are formed near the upper ends of the side edges of the back lid 23 to form pins 44 in the outer ends of the rounded upper edge of the back lid 23.

The pins 44 of the back lid 23 are rotatably fitted in the holes 40a of the support lugs 40 to support the back lid 23 for turning on the lower surface of the main wall 35 of the upper lid 24. The guide pins 42 of the back lid 23 are slidably fitted in the guide grooves 9 formed in the mouth side walls 8 of the case 2.

The lid assembly 21 consisting of the front lid 22, the back lid 23 and the upper lid 24 is supported on the case 2 for movement between a closed position and an open position.

Figure 6:
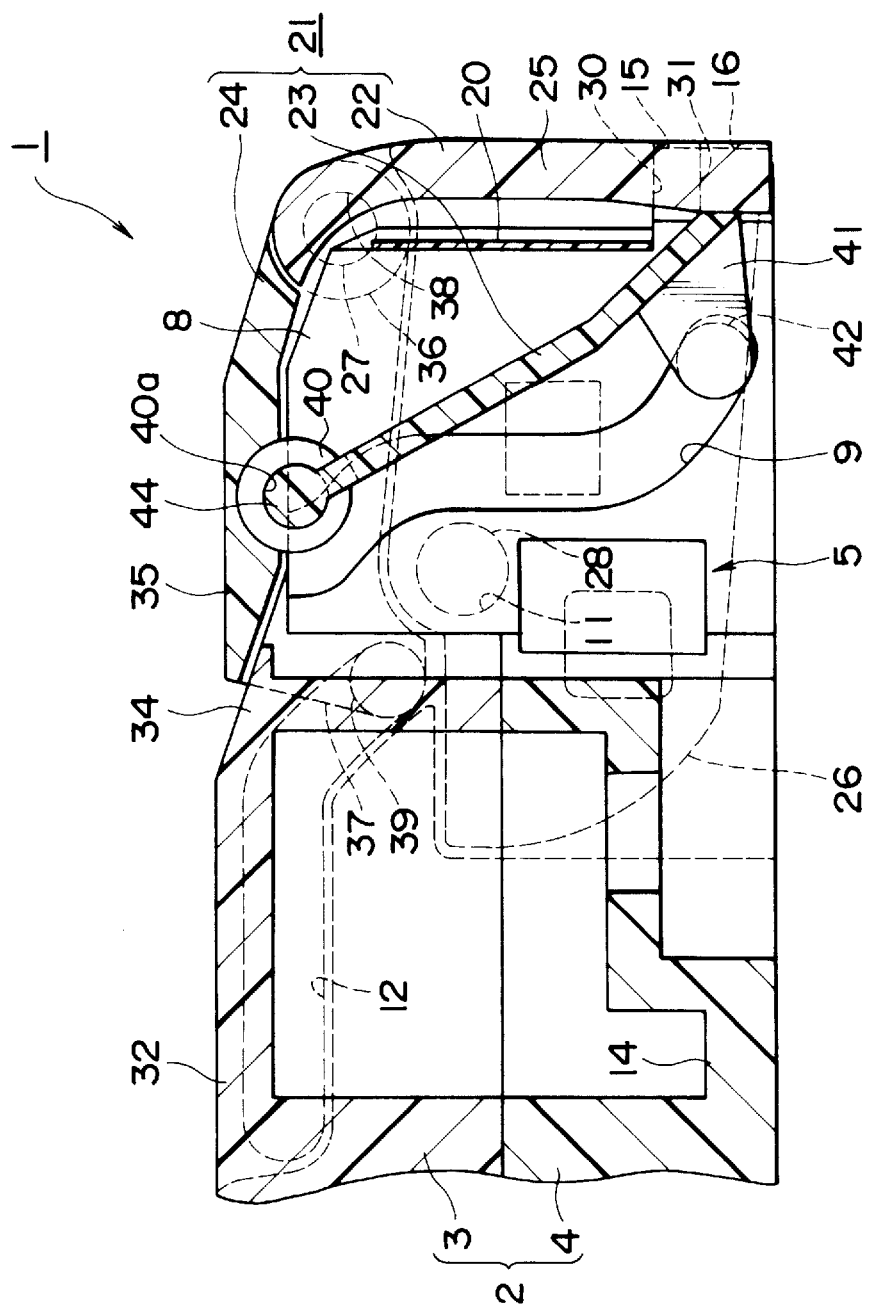
FIG. 6 is an enlarged sectional view taken on line VI—VI in FIG. 5.

When the lid assembly 21 is at the closed position as shown in FIG. 6, the front wall 25 of the front lid 22 covers the front surface of the case 2 and a portion of the magnetic tape 20 extending outside the case 2, the recesses 30 and 31 of the front wall 25 receive the locating contact protrusions 15, 15' and 16 therein with the bottom surfaces thereof seated on the upper surfaces of the locating contact protrusions 15, 15' and 16, respectively.

The front lid 22 is biased toward the closed position with a resilient means, not shown. The lower end of the front wall 25 of the front lid 22 is positioned in contact with or close to the portions 17, 17' and 17" of the lower half 4 of the case 2.

When the lid assembly 21 is at the closed position, the guide pins 42 of the back lid 23 are at the lower ends of the guide grooves 9, and the back lid 23 is declined toward the front behind the magnetic tape 20 within the mouth 5 with the lower end thereof in contact with the back surface of the front wall 25 of the front lid 22 to cover the magnetic tape 20 in the mouth 5 excluding the upper side of the magnetic tape 20 together with the front wall 25 of the front lid 22.

The guide pins 39 of the upper lid 24 are positioned at the front ends of the guide grooves 12 of the case 2, the main wall 35 of the upper lid 24 covers the front projections 33 of the top wall 32 of the case and the upper side of the mouth 5 to cover the upper side of the portion of the magnetic tape 20 extending across the mouth 5.

Thus, the portion of the magnetic tape 20 extending across the mouth 5 is covered entirely by the front wall 25 of the front lid 22, the back lid 23, and the main wall 35 of the upper lid 24 when the lid assembly 21 is at the closed position.

When the tape cassette 1 is loaded into the recording/reproducing apparatus, the front surface 16a of the locating contact protrusion 16 comes into contact with a locating lug 45 of the recording/reproducing apparatus for locating a miniature tape cassette, and the front surface 15'a of the locating contact protrusion 15' comes into contact with a locating lug 46 for locating a large tape cassette, so that the tape cassette 1 is located within the recording/reproducing apparatus.

When the tape cassette 1 is loaded into a recording/reproducing apparatus specially for operating large tape cassettes, the tape cassette 1 can accurately and stably located when the recording/reproducing apparatus is provided with locating lugs with which the respective front surfaces 15a and 15'a of the locating contact protrusions 15 and 15' come into contact.

When a pressure is applied to a portion of the front wall 25 of the front lid 22, the back surface of the portion to which the pressure is applied or a portion near the portion to which the pressure is applied is pressed against the portion 17, 17' or 17" because the lower end of the front wall 25 of the front lid 22 is in contact with or positioned close to the front surfaces of the portions 17, 17' and 17" of the lower half 4 of the case 2 when the lid assembly 21 is at the closed position. Accordingly, the front wall 25 is not bent greatly and there is no problem in the strength of the front lid 22.

Since the locating contact protrusions 15, 15' and 16 formed on the front surface of the case 2 are received in the recesses 30, 30' and 31 formed in the front wall 25 of the front lid 22, and the lower half 4 of the case 2 lies behind portions between the recesses 30, 30' and 31, only a very small gap is formed if the lid assembly 21 is moved slightly toward the open position and hence the dustproof performance of the tape cassette 1 is scarcely deteriorated.

Figure 12:
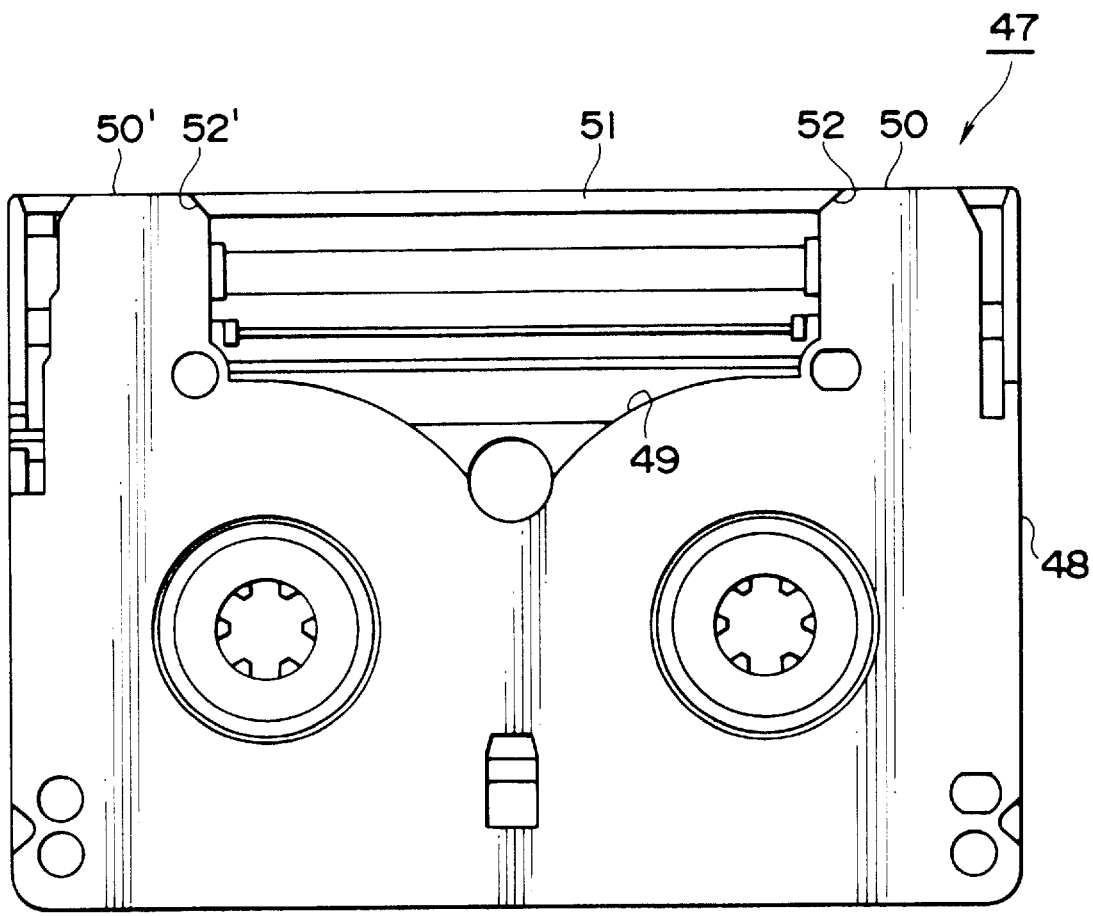
FIG. 12 is a bottom view of a miniature tape cassette.
Figure 13:
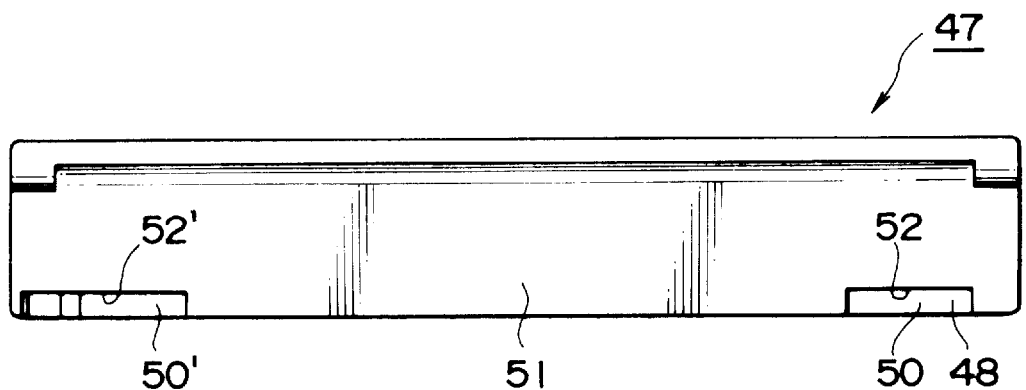
FIG. 13 is a front view of the miniature tape cassette of FIG. 12.

Referring to FIG. 12 showing a miniature tape cassette 47 for reference, a case 48 has a mouth 49 and locating contact protrusions 50 and 50' formed on the front wall of the case 48 at positions beside the opposite ends of the mouth 49, and a front lid 51 provided with recesses 52 and 52'. When the miniature tape cassette 47 is loaded into a recording/reproducing apparatus, the respective front surfaces of the locating contact protrusions 50 and 50' come into contact with locating lugs 45 and 45', so that the miniature tape cassette 47 is located in the recording/reproducing apparatus.

Figure 14:
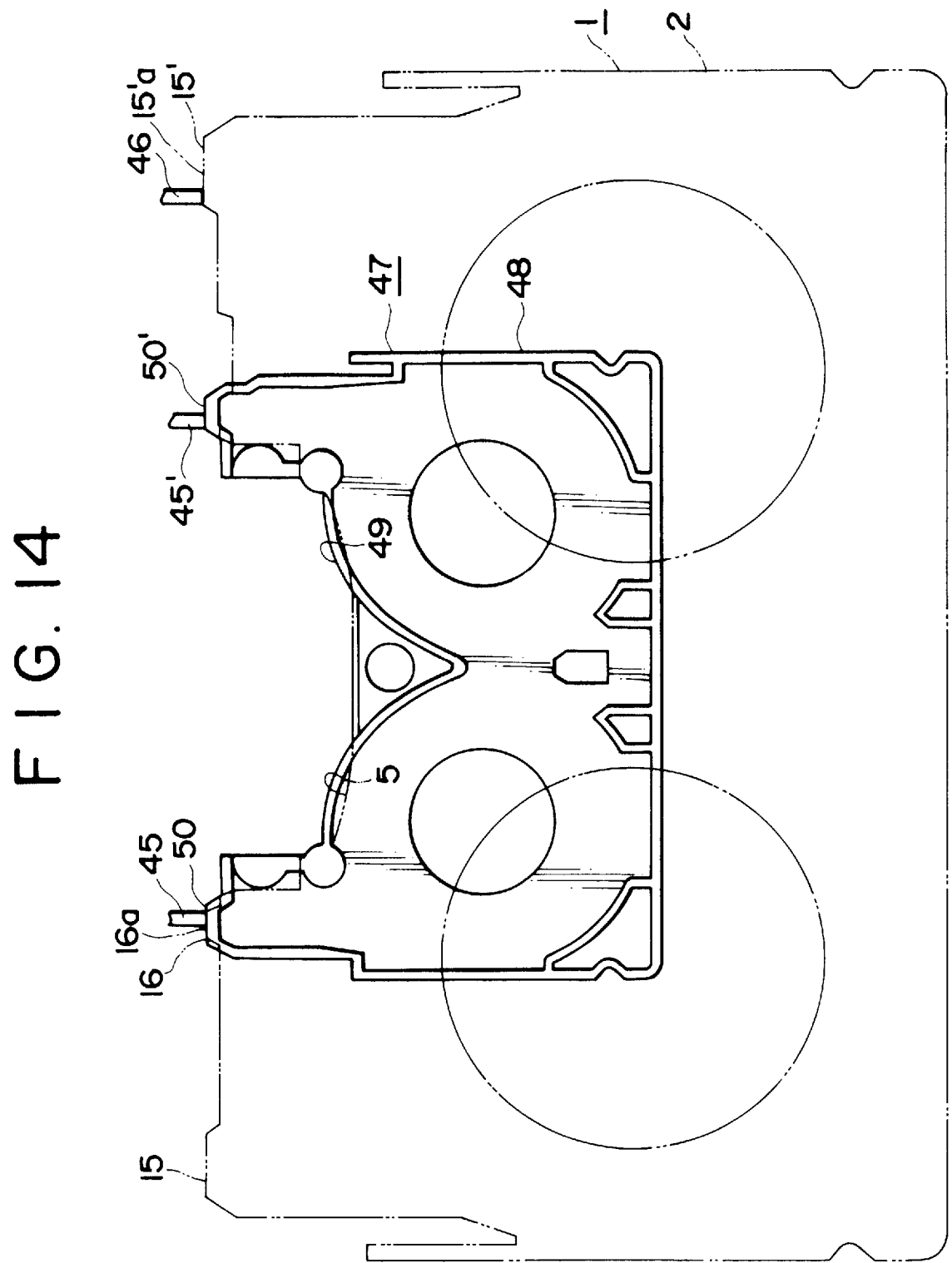
FIG. 14 is a schematic plan view of the miniature tape cassette of FIG. 12 superposed on the tape cassette of the present invention.
Figure 15:
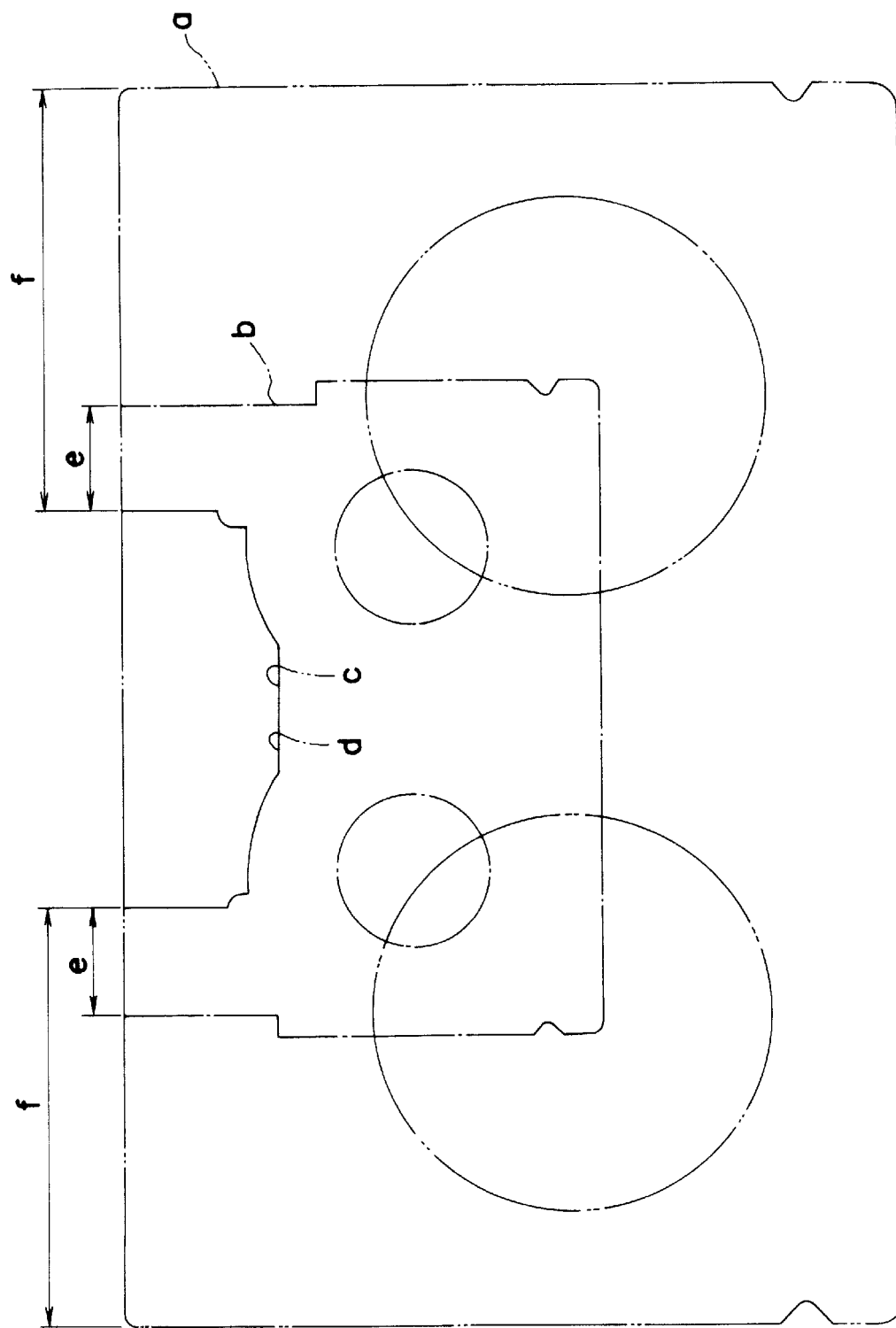
FIG. 15 is a schematic plan view of assistance in explaining problems in the related art, showing a large tape cassette and a miniature tape cassette superposed on the large tape cassette.
Figure 16:
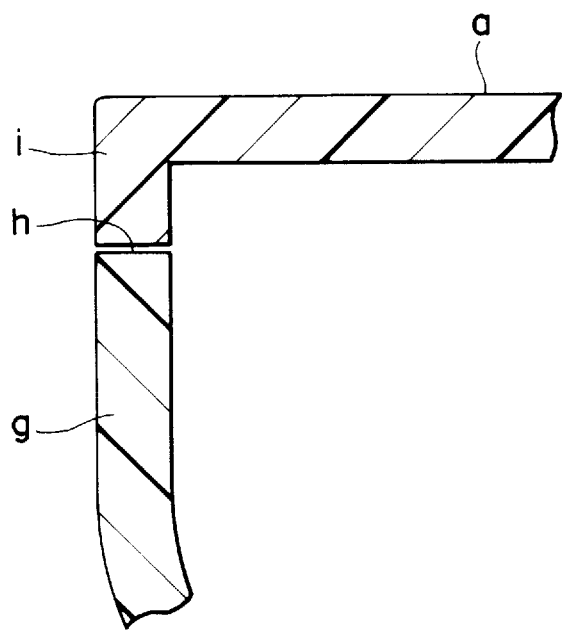
FIG. 16 is an enlarged fragmentary sectional view of an essential portion.

As shown in FIG. 14 showing the tape cassette 1 of the present invention and the miniature tape cassette 47 in a superposed view, the locating contact protrusion 16 of the tape cassette 1 and the locating contact protrusion 50 of the miniature tape cassette 47 coincide with each other.

As the tape cassette 1 is moved down toward the cassette mount of the recording/reproducing apparatus, the push pin of a lid opening member, not shown, of the recording/reproducing apparatus engages the lower ends of the side wall 26 of the front lid 22 to push the front lid 22 upward relative to the case 2. Consequently, the front lid 22 is turned counterclockwise as viewed in FIG. 6 and the upper lid 24 and the back lid 23 are moved accordingly toward the open position shown in FIG. 6.

Figure 7:
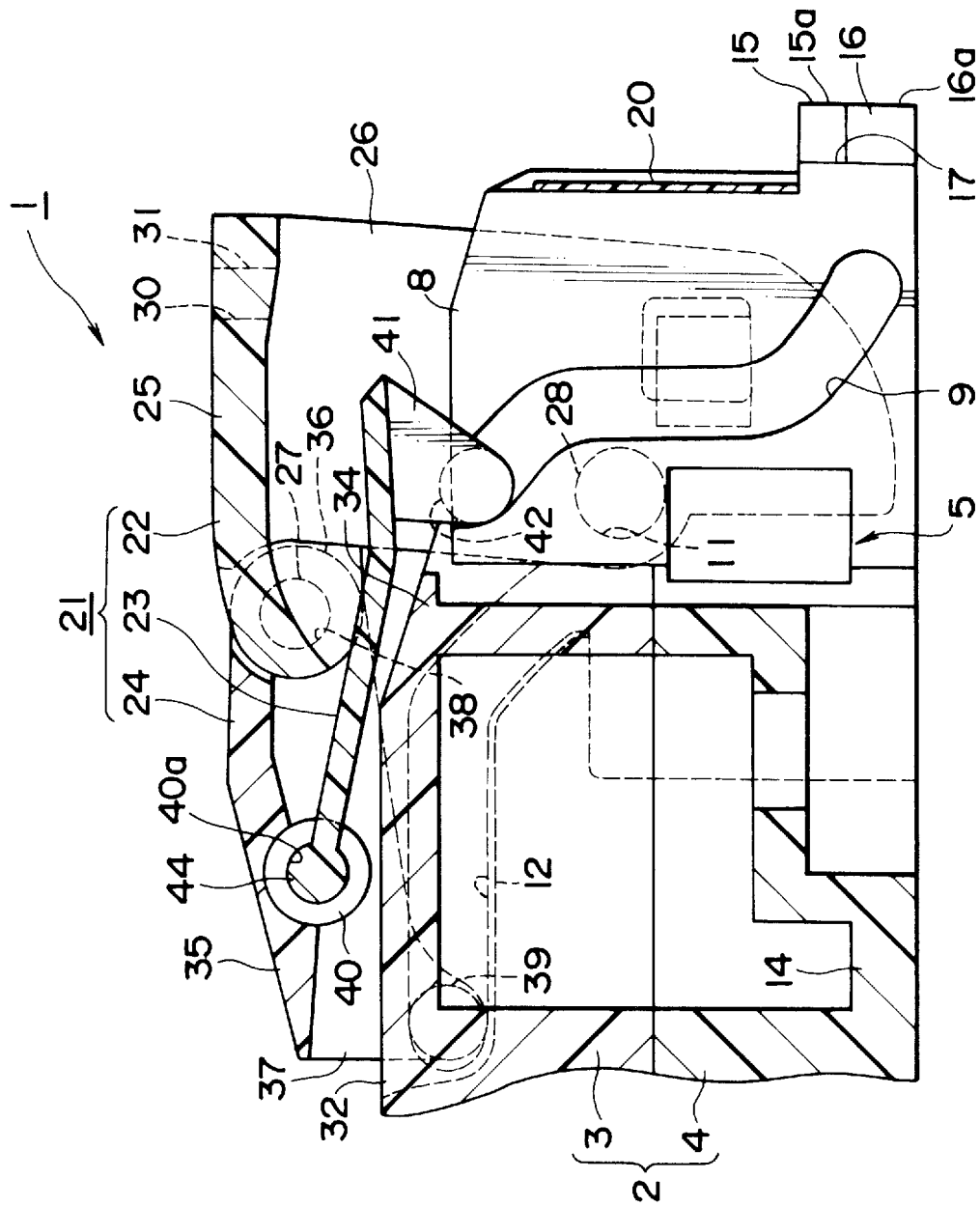
FIG. 7 is an enlarged sectional view, similar to FIG. 6, of the tape cassette in a state where a lid assembly is at its open position.
Figure 8:
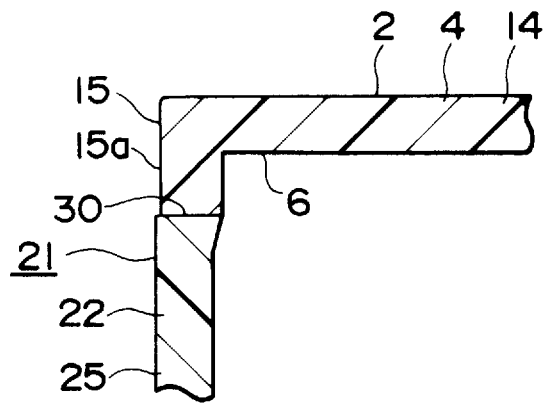
FIG. 8 is an enlarged fragmentary sectional view taken on line VIII—VIII in FIG. 3.
Figure 9:
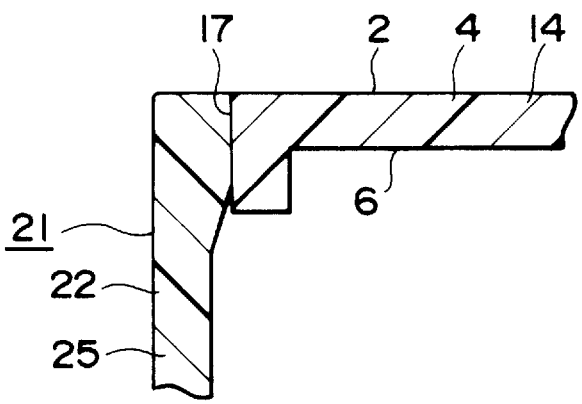
FIG. 9 is an enlarged fragmentary sectional view taken on line IX—IX in FIG. 3.
Figure 10:
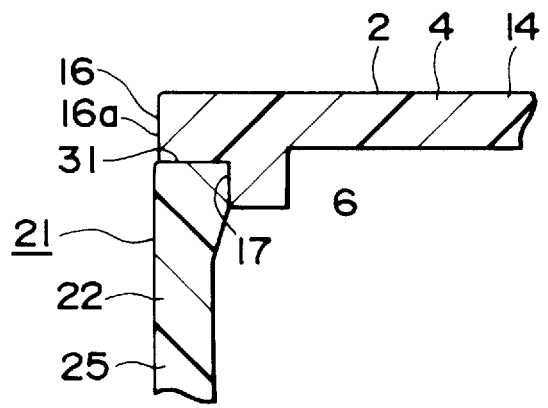
FIG. 10 is an enlarged fragmentary sectional view taken on line X—X in FIG. 3.
Figure 11:
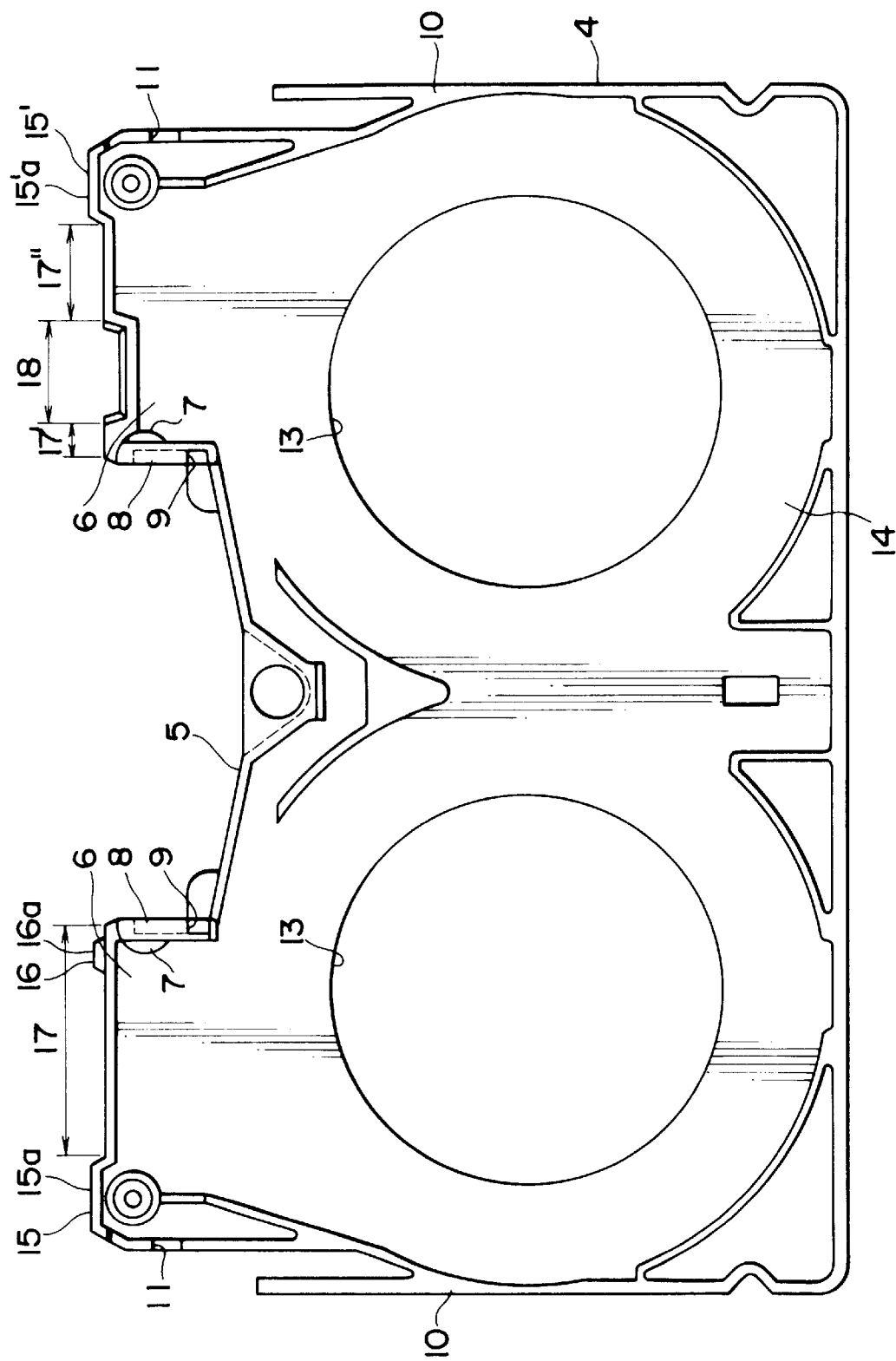
FIG. 11 is a plan view of a lower half.

The lid assembly 21 is moved at the open position as shown in FIG. 7 by turning the front lid 22 counterclockwise through an angle of about 90° from the closed position shown in FIG. 6. When the lid assembly 21 is at the open position, the front surface of the case 2 and the front side of the magnetic tape 20 are completely open.

The back lid 23 extends over the inclined portion 34 of the top wall 32 of the case 2 and a portion of the top wall 32 extending behind the inclined portion 34. The position of the back lid 23 during movement from the closed position shown in FIG. 6 to the open position shown in FIG. 7 is controlled by the positions of the pins 44 supported on the upper lid 24 and the positions of the guide pins 42 in the guide grooves 9.

The upper lid 24 overlies the back lid 24 substantially in parallel to the top wall 32 of the case 2. The position of the upper lid 24 during the movement from the closed position shown in FIG. 6 to the open position shown in FIG. 7 is controlled by the positions of the connecting walls 36 connected to the front lid 22 and the positions of the pins 39 in the guide grooves 12.

In addition, the shapes and constructions of the components of the tape cassette embodying the present invention, described herein are illustrative and not restrictive, and it is to be understood that the technical scope of the present invention is not limited by the embodiments specifically described herein.

What is claimed is:

1. A relatively large tape cassette adapted to be utilized in a recording/reproducing apparatus capable of using both a large tape cassette and a miniature tape cassette, said relatively large tape cassette comprising:
    a case including an upper half and a lower half, and having a recessed mouth along a front portion thereof;
    two tape reels rotatably supported within said case;
    a recording tape having forward, rearward, bottom and top surfaces and having opposite ends fastened to said two tape reels, respectively, and wound on said two tape reels so that a portion thereof extends along a front side of said recessed mouth of said case; and
    a lid assembly having a front lid, a back lid and an upper lid covering the portion of said recording tape extending along the front side of said recessed mouth while said tape cassette is not in use and said lid assembly is in a closed position thereof;
    wherein said lower half is formed with at least three non-movable locating contact protrusions along a front portion thereof wherein at least two of said locating contact protrusions are located at a relatively large distance therebetween which distance is larger than the length of the miniature tape cassette;
    said locating contact protrusions being contacted with locating lugs formed in said recording/reproducing apparatus in which at least one of said lugs is commonly used for contacting at least one locating contact protrusion of the miniature tape cassette adapted to be used in said recording/reproducing apparatus; and
    said locating contact protrusions being engaged with recesses formed on a lower edge of said front lid of said lid assembly when said tape cassette is not in use and said lid assembly is in said closed position.

2. A tape cassette according to claim 1, wherein at least one of said locating contact protrusions is positioned to be contacted by corresponding locating lug formed in said recording/reproducing apparatus which is only used to locate a large tape cassette.

3. A tape cassette according to claim 2, wherein said front portion of said lower half excluding said locating contact protrusions is in contact with said front lid of said lid assembly when said tape cassette is not in use.

4. A tape cassette according to claim 3, wherein said front lid covers the forward surface of said recording tape, said back lid covers the rearward surface and the bottom surface of said recording tape, and said upper lid covers the top surface of said recording tape when said lid assembly is in said closed condition; and said front lid is provided with said recesses to be engaged with said locating contact protrusions.

5. A relatively large tape cassette adapted to be utilized in a recording/reproducing apparatus capable of using both a large tape cassette and a miniature tape cassette, said relatively large tape cassette comprising:
    a case including an upper half and a lower half, and having a recessed mouth along a front portion thereof;
    two tape reels rotatably supported within said case;
    a recording tape having forward, rearward, bottom and top surfaces and having opposite ends fastened to said two tape reels, respectively, and wound on said two tape reels so that a portion thereof extends along a front side of said recessed mouth of said case; and
    a lid assembly having a front lid, a back lid and an upper lid covering the portion of said recording tape extending a long the front side of said recessed mouth while said tape cassette is not in use and said lid assembly is in a closed position thereof;
    wherein said lower half is formed with at least three non-movable locating contact protrusions wherein at least two of said locating contact protrusions are located at a relatively large distance therebetween which distance is larger than the length of the miniature tape cassette;
    said locating contact protrusions being contacted with locating lugs formed in said recording/reproducing apparatus in which at least one of said lugs is commonly used for contacting at least one locating contact protrusion of a miniature tape cassette adapted to be used in said recording/reproducing apparatus, and said locating contact protrusions being engaged with recesses formed on a lower edge of said front lid of said lid assembly when said tape cassette is not in use and said lid assembly is in said closed position, and
    the front portion of said lower half excluding said locating contact protrusions is in contact with said front lid of said lid assembly when said tape cassette is not in use.

6. A tape cassette according to claim 5, wherein said lid assembly comprises said front lid for covering the forward surface of said recording tape, said back lid for covering the rearward surface and the bottom surface of said recording tape, and said upper lid for covering the top surface of said recording tape.

7. A tape cassette according to claim 6, wherein at least one of said locating contact protrusions is positioned to be contacted by corresponding locating lug formed in said recording/reproducing apparatus which is only used to locate a large tape cassette.

8. A relatively large tape cassette adapted to be utilized in a recording/reproducing apparatus capable of using both a large tape cassette and a miniature tape cassette, said relatively large tape cassette comprising:

a case including an upper half and a lower half, and having a recessed mouth along a front side thereof;

two tape reels rotatably supported within said case;

a recording tape having forward, rearward, bottom and top surfaces and having opposite ends fastened to said two tape reels, respectively, and wound on said two tape reels so that a portion thereof extends along a front side of said recessed mouth of said case; and a lid assembly having a front lid, a back lid and an upper lid covering the portion of said recording tape extending along the front side of said recessed mouth while said tape cassette is not in use and said lid assembly is in a closed position thereof;

wherein said lower half is formed with at least three non-movable locating contact protrusions wherein at least two of said locating contact protrusions are located at a relatively large distance therebetween which distance is larger than the length of the miniature tape cassette;

said locating contact protrusions being contacted with locating lugs formed in said recording/reproducing apparatus in which at least one of said lugs is commonly used for contacting at least one locating contact protrusion of a miniature tape cassette adapted to be used in said recording/reproducing apparatus; and said locating contact protrusions being engaged with recesses formed on a lower edge of said front lid of said lid assembly when said tape cassette is not in use and said lid assembly is in said closed position; and wherein said front lid covers the forward surface of said recording tape, said back lid covers the rearward surface and the bottom surface of said recording tape, and said upper lid covers the top surface of said recording tape when said lid assembly is in said closed position and said front lid is provided with said recesses to be engaged with said locating contact protrusions.

9. A tape cassette according to claim 8, wherein at least one of said locating contact protrusions is positioned to be contacted by a corresponding locating lug formed in said recording/reproducing apparatus which is only used to locate a large tape cassette.

* * * * *